US008368820B2

(12) United States Patent
Yokota

(10) Patent No.: US 8,368,820 B2
(45) Date of Patent: Feb. 5, 2013

(54) LIGHTING DEVICE, DISPLAY DEVICE AND TELEVISION RECEIVER

(75) Inventor: Masashi Yokota, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 256 days.

(21) Appl. No.: 12/741,227

(22) PCT Filed: Jul. 18, 2008

(86) PCT No.: PCT/JP2008/063014

§ 371 (c)(1),
(2), (4) Date: May 4, 2010

(87) PCT Pub. No.: WO2009/075123

PCT Pub. Date: Jun. 18, 2009

(65) Prior Publication Data

US 2010/0265415 A1 Oct. 21, 2010

(30) Foreign Application Priority Data

Dec. 12, 2007 (JP) ................................ 2007-320790

(51) Int. Cl.
*H04N 3/14* (2006.01)

(52) U.S. Cl. ....................................... 348/790; 348/739

(58) Field of Classification Search .......... 348/790–791, 348/776–777, 797–798, 801, 836–837, 739, 348/751, 794; 362/61, 80, 225–226, 249; 315/229, 235, 169.3, 324; *H04N 3/14*
See application file for complete search history.

(56) References Cited

U.S. PATENT DOCUMENTS

| | | | | |
|---|---|---|---|---|
| 4,923,406 | A * | 5/1990 | Bucknam | 439/77 |
| 5,556,514 | A * | 9/1996 | Didier | 162/358.3 |
| 5,664,870 | A * | 9/1997 | Uchida et al. | 362/459 |
| 6,296,796 | B1 * | 10/2001 | Gordon | 264/255 |
| 6,553,998 | B2 * | 4/2003 | Heaton et al. | 128/897 |
| 7,121,837 | B2 * | 10/2006 | Sato et al. | 439/66 |
| 7,615,935 | B2 * | 11/2009 | Takata | 315/229 |
| 2006/0279957 | A1 | 12/2006 | Kwon et al. | |
| 2012/0202331 | A1 * | 8/2012 | Ohnuma et al. | 438/301 |

FOREIGN PATENT DOCUMENTS

| | | | |
|---|---|---|---|
| JP | 2000-207906 | A | 7/2000 |
| JP | 2003-178718 | A | 6/2003 |
| JP | 2006-344602 | A | 12/2006 |
| JP | 2007-250527 | A | 9/2007 |

OTHER PUBLICATIONS

Official Communication issued in International Patent Application No. PCT/JP2008/063014, mailed on Aug. 19, 2008.

* cited by examiner

*Primary Examiner* — Trang U Tran
(74) *Attorney, Agent, or Firm* — Keating & Bennett, LLP

(57) ABSTRACT

A lighting device 12 of the present invention includes a light source 17, an external power source 21 arranged to supply drive power to the light source 17, and a relay connector 19 arranged to provide an electrical connection between the light source 17 and the external power source 21. The relay connector 19 includes a conductive resin layer 40 and an insulating resin layer 50 arranged on the periphery of the conductive resin layer 40. According to the construction, the conductive portion and the insulating portion of the relay connector 19 are both made of resin, and therefore can be formed by the same process, e.g., by two-shot molding. Further, the number of components can be reduced.

7 Claims, 12 Drawing Sheets

LIGHTING DEVICE, DISPLAY DEVICE AND TELEVISION RECEIVER

TECHNICAL FIELD

The present invention relates to a lighting device, a display device and a television receiver.

BACKGROUND ART

In a display device having non-luminous optical elements as typified by a liquid crystal display device, a backlight device is provided on the backside of a display panel such as a liquid crystal panel, so as to illuminate the display panel. For instance, the backlight device, arranged on the backside of the liquid crystal panel (i.e., on the opposite side of the display surface), includes a chassis having an opening on the liquid crystal panel side, and further includes a number of lamps (e.g., cold cathode tubes) contained in the chassis. Further included are lamp holders mainly arranged to fix the end portions of the lamps (as shown in Patent Document 1, for example).

Patent Document 1 discloses a lamp holder that includes a holder body and a power application member fixed to the holder body. The holder body has a lamp support for supporting an end portion of a lamp, while a power-supply wire for power delivery for electrodes provided on the end portions of lamps is connected to the power application member by press fitting. The lamp holder thus includes the power application member preliminarily connected to the power-supply wire by press fitting, and therefore the electrical connection between the lamp and the power-supply wire can be established simply as a result of an operation for fixing the lamp to the holder body. Thereby, the assembly productivity may be improved.

Patent Document 1: JP-A-2006-344602

Problem to be Solved by the Invention

Conventionally, the lamp holder is assembled from a conductive power application member and an insulating cover member. Specifically, the power application member is made of metal, which includes an electrode connecting terminal to be connected to the electrode of the lamp for power supply, and further include a power receiving portion such as a power-supply wire or a board connecting terminal to be connected to an external power board. Thereby, the power application member can provide the electrical connection between the lamp and the board.

The power application member (or specifically, the board connecting terminal) is prone to electric discharge because of a high voltage applied thereto. Accordingly, a leak may occur between the power application member and a conductor approaching the power application member, for example. In order to suppress the leak, the holder body as an insulating member is arranged to surround or cover the power application member. Particularly, Patent Document 1 also discloses a technology for mounting an additional insulating cover to the holder body, in order to suppress the leak completely.

The lamp holder should have inside conductivity and external insulation as described above. Therefore, the manufacture process thereof includes preparing a conductive member and an insulating member individually, and further includes mounting the conductive member into the insulating member. Thus, the manufacture of lamp holders requires a number of components and a lot of man-hours, which prevents the reduction in cost of the lamp holders and therefore of a lighting device including the lamp holders.

DISCLOSURE OF THE INVENTION

The present invention was made in view of the foregoing circumstances, and an object thereof is to provide a lighting device having relay connectors, which can be provided with a reduced number of components and with a reduced number of man-hours, and thereby contribute to cost reduction. A further object of the present invention is to provide a display device having the lighting device and further provide a television receiver having the display device.

Means for Solving the Problem

In order to solve the above problem, a lighting device according to the present invention includes a light source, an external power source arranged to supply drive power to the light source, and a relay connector arranged to provide an electrical connection between the light source and the external power source. The relay connector includes a conductive resin layer and an insulating resin layer arranged on the periphery of the conductive resin layer.

The relay connector is thus formed of a conductive resin layer and an insulating resin layer, and therefore these layers can be formed by the same process, e.g., by two-shot molding. Consequently, the number of components can be reduced in comparison to the conventional construction, resulting in contribution to the cost reduction in the lighting device. Note that the relay connector should include a conductive member for providing the electrical connection between the light source and the external power source and an insulating member for suppressing a leak from the conductive member. Conventionally, the conductive member and the insulating member are separately formed, and thereafter are assembled into a single member. The reason is as follows: The conductive member is made of metal, while the insulating member is made of resin, for example. The members thus differing in material from each other should be formed individually by different processes. According to this conventional construction, the reduction in the number of components of the lighting device and in the number of man-hours required for the assembly operation is prevented, because the relay connector should be assembled from two or more members as described above. This problem leads to difficulty in achieving the cost reduction in the lighting device.

In considering the reduction in the number of components of a relay connector and in the number of man-hours required for the assembly thereof, the inventor of the present application has focused on a combination of a conductive resin and an insulating resin. The conductive resin is formed of a resin originally having an insulating property, but has conductivity due to conductive materials included therein, such as carbon black particles, carbon fibers, metallic microparticles or metallic fibers. The forming of the conductive resin can be achieved by a similar process to that for the original or insulating resin. Therefore, a molded product as a single unit can be formed from the conductive resin and the insulating resin by a single molding process (e.g., by two-shot molding).

According to the present invention, the relay connector can be thus formed as a single member, which includes a conductive resin layer and an insulating resin layer arranged on the periphery of the conductive resin layer. Consequently, the number of components can be reduced, and thereby cost reduction in the lighting device can be achieved.

BEST MODE FOR CARRYING OUT THE INVENTION

An embodiment according to the present invention will be explained with reference to FIGS. 1 to 8. In the present embodiment, a television receiver TV having a liquid crystal display device 10 will be illustrated.

Figure 1:
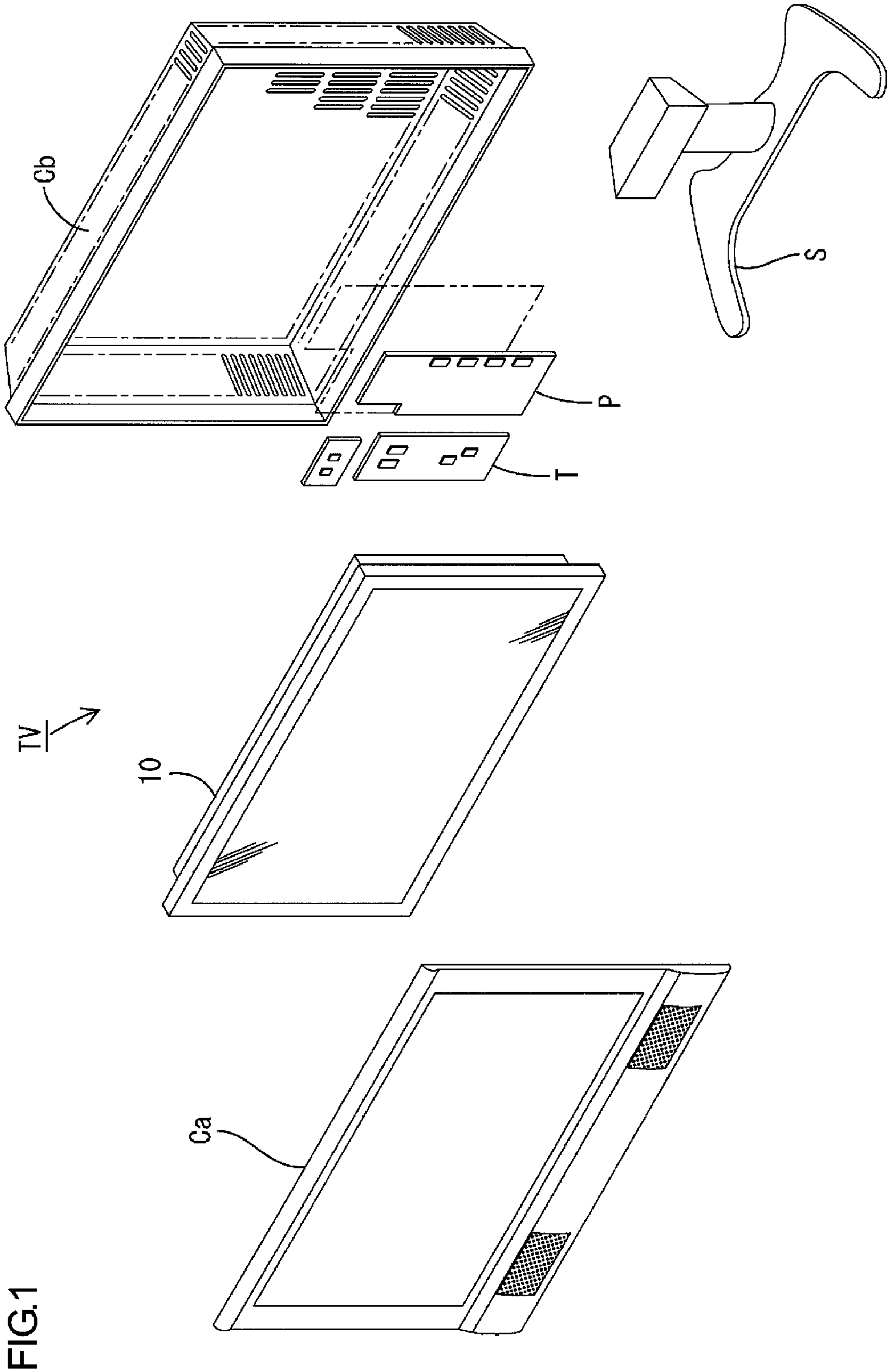
FIG. 1 is an exploded perspective view showing the general construction of a television receiver according to an embodiment of the present invention.
Figure 2:
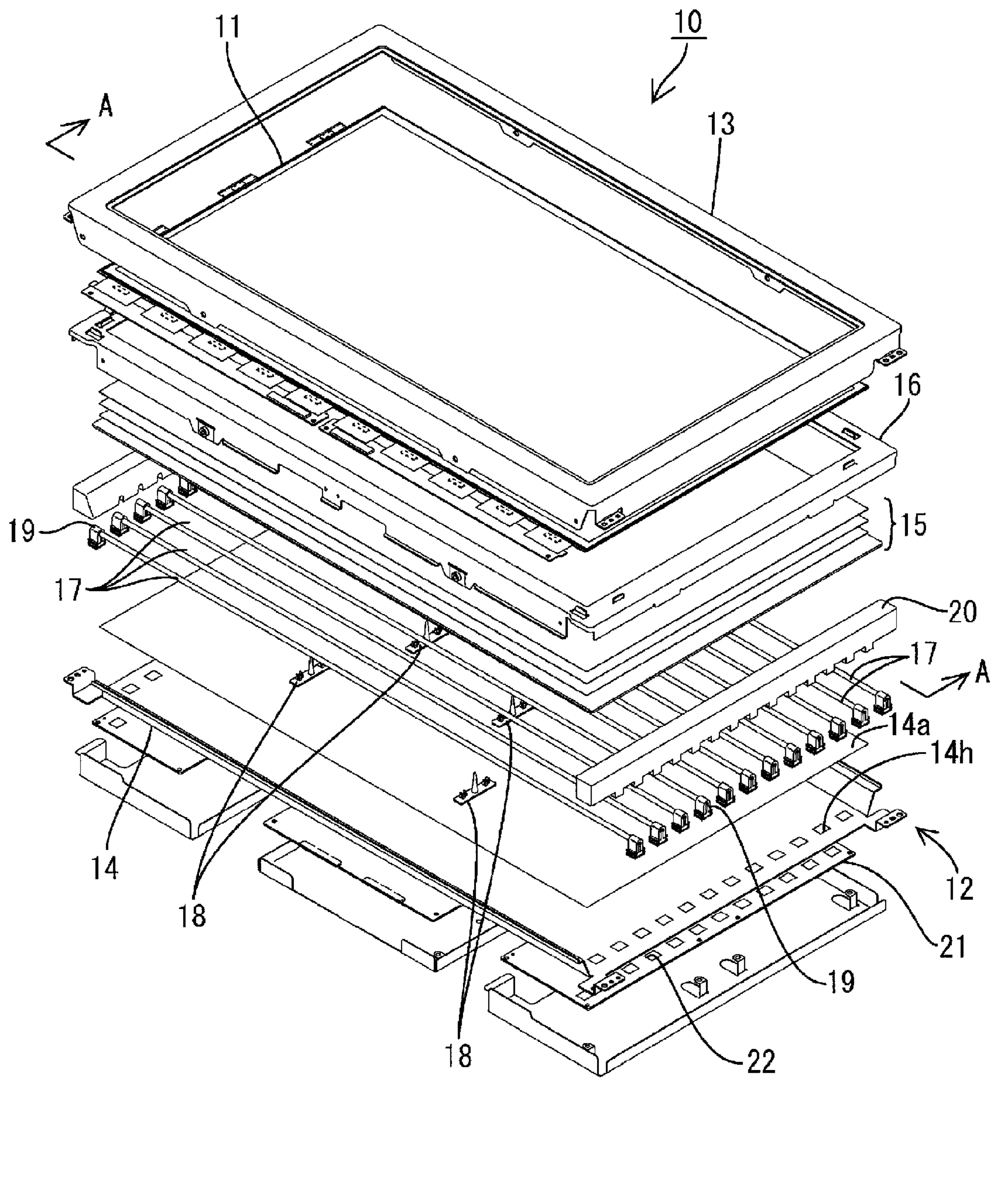
FIG. 2 is an exploded perspective view showing the general construction of a liquid crystal display device included in the television receiver shown in FIG. 1.
Figure 3:
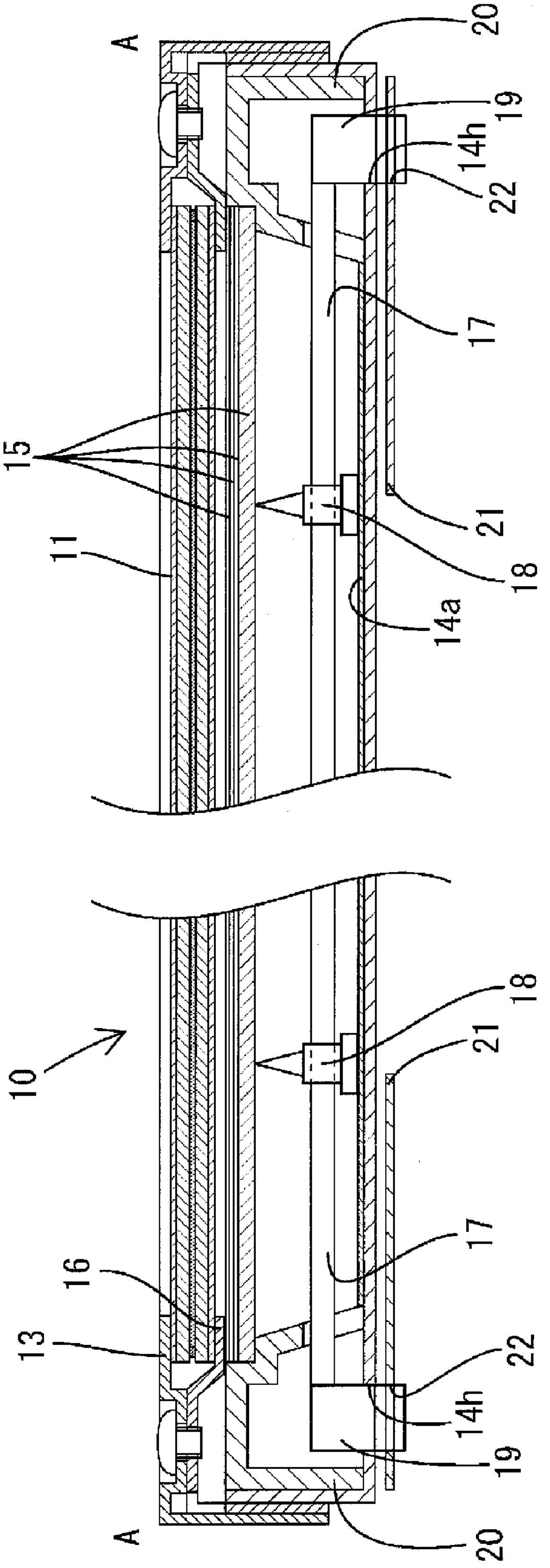
FIG. 3 is a sectional view showing the construction of the liquid crystal display device of FIG. 2 along the line A-A.
Figure 4:
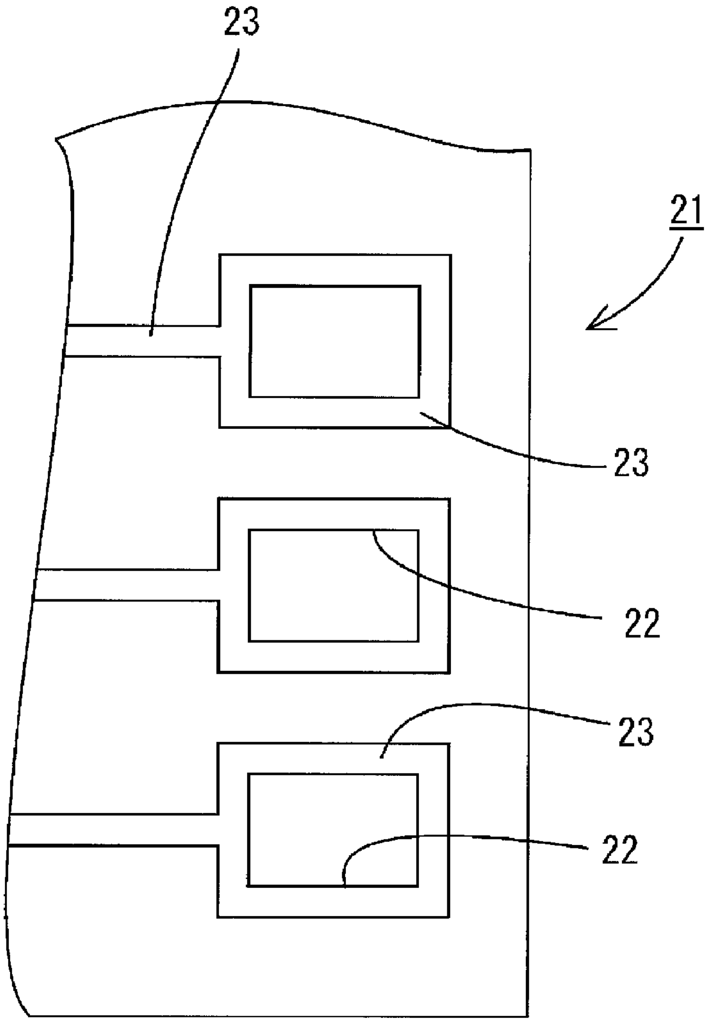
FIG. 4 is an enlarged plan view of a characteristic part of an inverter board included in the liquid crystal display device shown in FIG. 2.
Figure 5:
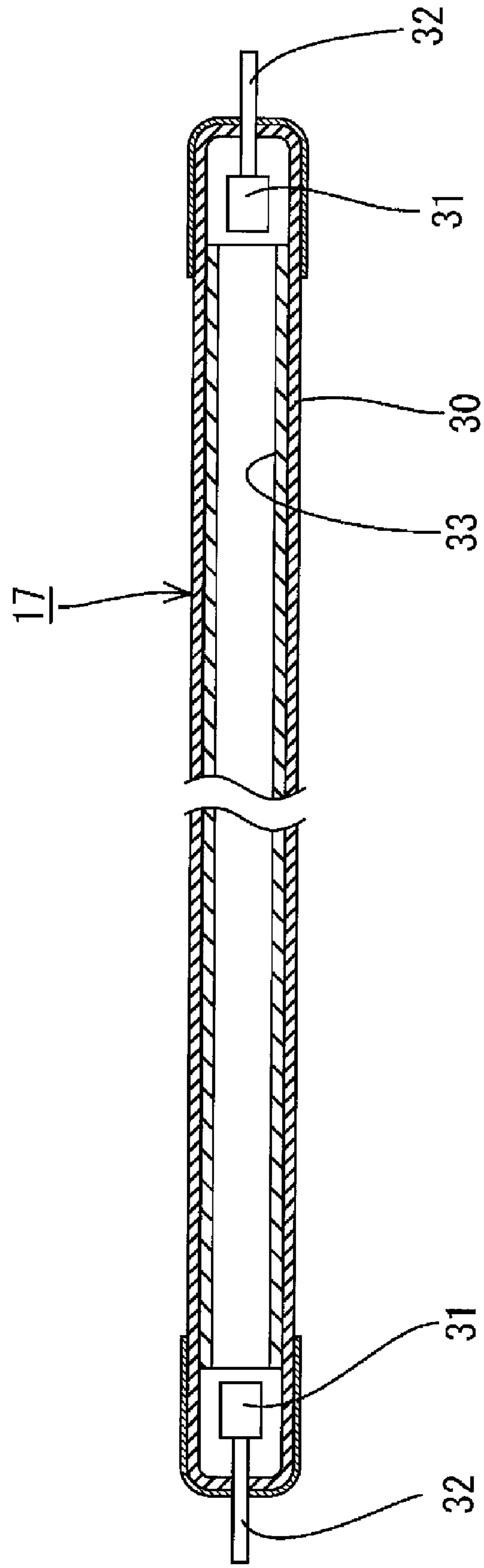
FIG. 5 is a sectional view showing the general construction of a cold cathode tube included in the liquid crystal display device shown in FIG. 2.
Figure 6:
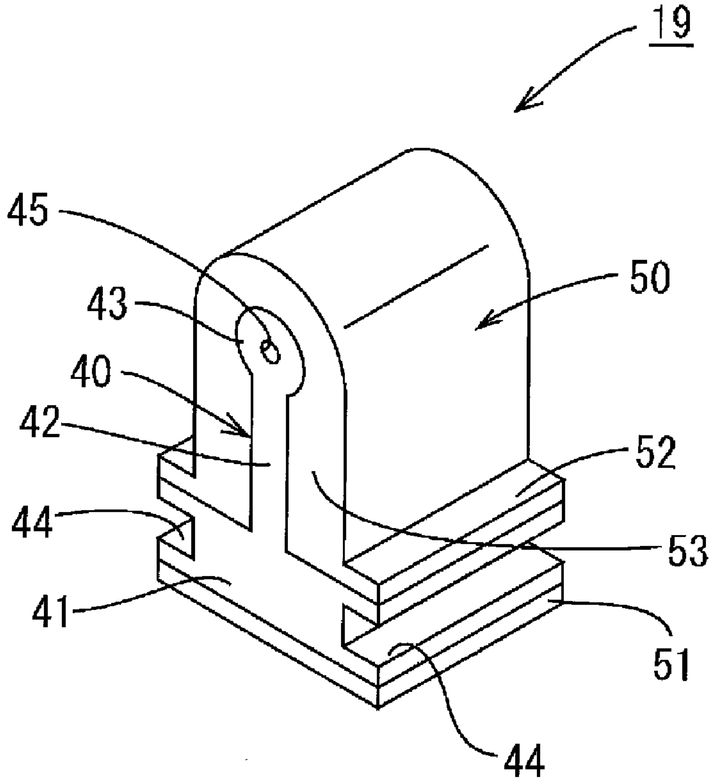
FIG. 6 is a perspective view showing the general construction of a relay connector to be connected to the cold cathode tube.
Figure 7:
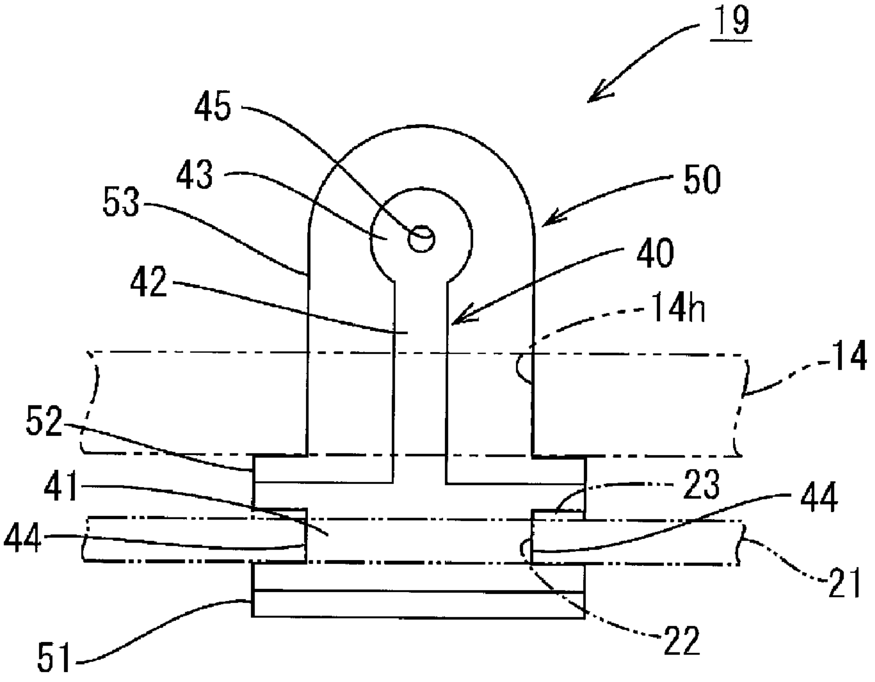
FIG. 7 is a front view illustrating how to mount the relay connector shown in FIG. 6.
Figure 8:
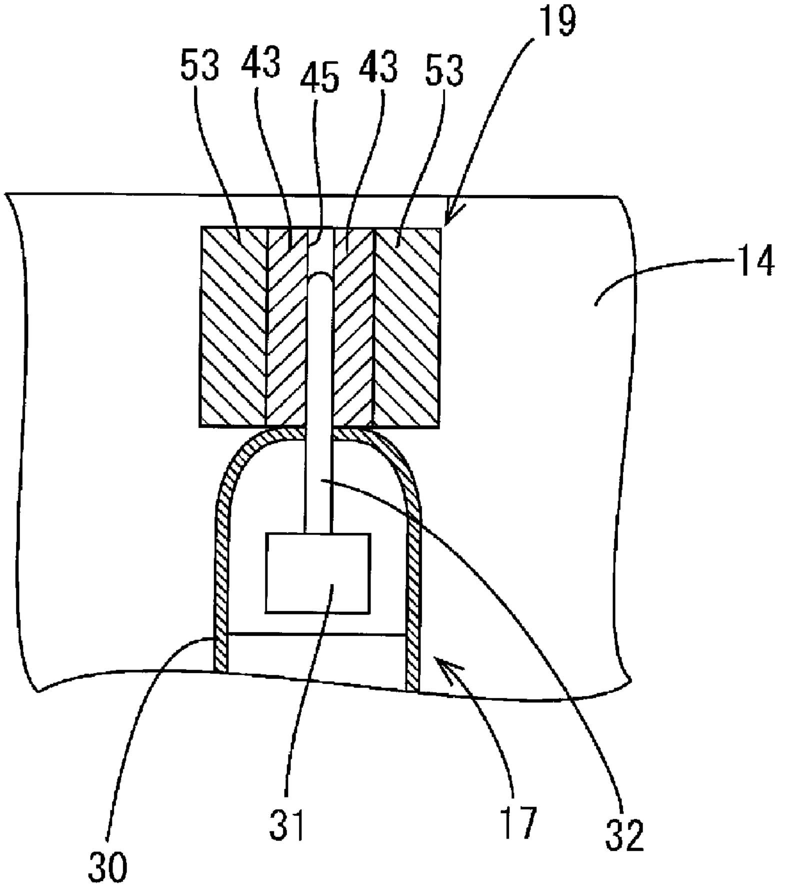
FIG. 8 is a sectional view illustrating how to mount the relay connector shown in FIG. 6 to the cold cathode tube.

FIG. 1 is an exploded perspective view showing the general construction of the television receiver according to the present embodiment. FIG. 2 is an exploded perspective view showing the general construction of the liquid crystal display device. FIG. 3 is a sectional view of the liquid crystal display device along the line A-A. FIG. 4 is an enlarged plan view of a characteristic part of an inverter board included in the liquid crystal display device. FIG. 5 is a sectional view showing the general construction of a cold cathode tube included in the liquid crystal display device. FIG. 6 is a perspective view showing the general construction of a relay connector to be connected to the cold cathode tube. FIG. 7 is a front view illustrating how to mount the relay connector. FIG. 8 is a sectional view illustrating how to mount the relay connector to the cold cathode tube.

Referring to FIG. 1, the television receiver TV according to the present embodiment includes the liquid crystal display device 10, and front and back cabinets Ca and Cb capable of holding the liquid crystal display device 10 therebetween. Further included are a power source P, a tuner T and a stand S. The liquid crystal display device (display device) 10, held therein, forms a horizontally-elongated rectangular shape as a whole, which is arranged in an upright position so that the short side thereof extends along the vertical direction. Referring to FIG. 2, the liquid crystal display device 10 includes a liquid crystal panel 11 as a display panel and a backlight device 12 as an external light source, which are integrally held by a bezel 13 and the like.

Next, the liquid crystal panel 11 and the backlight device 12 of the liquid crystal display device 10 will be explained (See FIGS. 2 and 3).

The liquid crystal panel (as a display panel) 11 includes a pair of glass substrates, which are attached to each other so as to face each other while a gap of a predetermined size is kept therebetween. Liquid crystal is sealed between the glass substrates. On one of the glass substrates, components such as switching elements (e.g., TFTs) connected to source wiring lines and gate wiring lines running at right angles to each other, and pixel electrodes connected to the switching elements are provided. On the other of the glass substrates, components such as a counter electrode and a color filter having R (Red), G (Green), and B (Blue) color sections arranged in a predetermined pattern are provided.

The backlight device (as a lighting device) 12 is a so-called direct-light type backlight device that includes a plurality of light sources (e.g., cold cathode tubes 17 as high-pressure discharge tubes, in the present embodiment), which are positioned directly below the back surface of the liquid crystal panel 11 (i.e., the panel surface on the opposite side of the display side), and are arranged along the panel surface.

The backlight device 12 further includes a chassis 14 having a substantially box-like shape with an opening on its upper side, and a plurality of optical members 15 (e.g., a diffuser plate, a diffusing sheet, a lens sheet and a reflective polarizing plate, in this order from the lower side of the figure) which are arranged to cover in the opening of the chassis 14. Further included is a frame 16 arranged to hold the optical members 15 on the chassis 14. The chassis 14 contains the cold cathode tubes 17, lamp clips 18 arranged to mount the cold cathode tubes 17 on the chassis 14, relay connectors 19 arranged as electric relays at the end portions of the cold cathode tubes 17, and holders 20 arranged to collectively cover the end portions of the cold cathode tubes 17 and the relay connectors 19. Note that the optical member 15 side of the cold cathode tubes 17 corresponds to the light emitting side of the backlight device 12.

The chassis 14 is made of metal, and substantially forms a shallow box-like shape that includes a rectangular bottom plate and side surfaces raised from the respective sides of the bottom plate. Through holes 14*h* for mounting the relay connectors 19 therethrough are formed through the chassis 14 so as to be located at the positions corresponding to the end portions of the cold cathode tubes 17 (i.e., at the arrangement positions of the relay connectors 19). Further, a reflective sheet 14*a* is provided on the chassis 14 so as to form a light reflecting surface, which is arranged on the side of the cold cathode tubes 17 that corresponds to the opposite side of the light emitting side (i.e., arranged on the inner surface side of the bottom plate of the chassis 14).

The reflective sheet 14*a* is made of synthetic resin, and the surface thereof is colored with white so as to have superior reflexibility. It is laid on the inner surface of the chassis 14 so as to cover almost the entire area thereof, as shown in FIG. 3. Thereby, the reflective sheet 14*a* is integrated with the chassis 14 so as to form the side surfaces of the chassis 14. The reflective sheet 14*a* can reflect the lights from the cold cathode tubes 17 to the optical members 15 including the diffuser plate.

Inverter boards (as an external power source) 21 are mounted to the chassis 14, or specifically, mounted on the surface on the opposite side of the cold cathode tubes 17 or of the reflective sheet 14*a* (i.e., on the outer surface of the bottom plate of the chassis 14), so as to be arranged on the two respective end portions of the chassis 14 located at the ends of the long side thereof. Referring to FIG. 4, rectangular mounting holes 22 are formed on the inverter boards 21, so as to be located to overlap with the relay connectors 19 described above. The relay connectors 19 can be mounted through the respective mounting holes 22. The width of each mounting hole 22 is set to be smaller than the width of the board connecting portion 41, described below, of the relay connector 19. A circuit pattern 23 is formed on the inverter board 21, so as to surround the peripheries of the mounting holes 22. The surrounding circuit pattern 23 partly projects along the inverter board 21, and is connected to a circuit component (not shown) such as a transformer that generates a high-frequency voltage as drive power for the cold cathode tubes 17.

Each cold cathode tube 17 has an elongated tubular shape. A number (e.g., twelve in FIG. 2) of cold cathode tubes 17 are contained in the chassis 14 so that the longitudinal direction (or axial direction) thereof conforms with the long-side direction of the chassis 14. Referring to FIG. 5, each cold cathode tube 17 includes an elongated glass tube 30 with sealed end portions, electrodes 31 enclosed in the respective end portions of the glass tube 30, and outer leads (as a drive power input portion) 32 projecting from the respective electrodes 31 to the outside of the glass tube 30. The glass tube 30 includes mercury, or the like, encapsulated therein, and phosphor 33 is applied to the inner wall surface thereof. The end portions including the electrodes 31 form nonluminous parts of the cold cathode tube 17, while the remaining portion or the central portion (i.e., the portion to which the phosphor 33 is applied) forms a luminous part.

The relay connectors 19 are arranged in the short-side direction of the chassis 14 (i.e., in the array direction of the cold cathode tubes 17) on the end portions of the chassis 14 located at the ends of the long side thereof, so as to correspond to the respective end portions of the cold cathode tubes 17 (See FIG. 2). Referring to FIG. 6, each relay connector 19 includes a conductive rubber layer (as a conductive resin layer) 40 and an insulating rubber layer (as an insulating resin layer) 50 arranged on the periphery of the conductive rubber layer 40, which are integrated with each other.

The conductive rubber layer 40 is formed of a conductive rubber, such as silicon rubber including conductive materials (e.g., carbon black particles). The conductive rubber layer 40 includes aboard connecting portion 41 as a bedplate-like portion at the lower side, a link portion 42 as an upright plate-like portion extending upward from the board connecting portion 41, and an electrode connecting portion 43 that has a substantially cylindrical shape and is arranged at the distal end (or upper end in FIG. 6) of the link portion 42.

The board connecting portion 41 includes linear concave portions 44, which are arranged on two side surfaces thereof (i.e., the side surfaces along the long sides thereof) so as to extend along the two side surfaces. Each linear concave portion 44 has a rectangular cross-section, and the width thereof (or the length along the vertical direction in FIG. 6) is set to be equal to or slightly smaller than the thickness of the inverter board 21. On the other hand, an outer-lead insert hole (as an insert hole) 45 is formed through the electrode connecting portion 43 so as to be located at the center section of the circular cross-section thereof. The outer-lead insert hole 45 has a circular cross-section, and is arranged so that the axial direction thereof conforms with the axial direction the electrode connecting portion 43. The diameter of the outer-lead insert hole 45 is set to be slightly smaller than the diameter of the outer lead 32.

On the other hand, the insulating rubber layer 50 is formed of silicon rubber having an insulation property. The insulating rubber layer 50 includes a bottom-surface covering portion 51 arranged to cover the bottom surface of the board connecting portion 41, an upper-surface covering portion 52 arranged to cover the upper surface of the board connecting portion 41, and an upper-part covering portion 53 that has a U-shaped cross-section and is arranged to collectively cover the side surfaces of the link portion 42 and the electrode connecting portion 43. The surfaces of the conductive rubber layer 40, or specifically, the surfaces having an opening of the outer-lead insert hole 45 and the surfaces having the linear concave portions 44 of the board connecting portion 41 are exposed without being covered with the insulating rubber layer 50.

The relay connector 19 having the above construction can be formed by two-shot extrusion molding. Specifically, an extruder having two extrusion cylinders is prepared, and a conductive rubber material (e.g., silicon rubber including conductive materials) is supplied to one of the extrusion cylinders while an insulating rubber material (e.g., silicon rubber) is supplied to the other of the extrusion cylinders. The both materials are plasticated, and thereafter are forced through a single extrusion die, which is shared by the two extrusion cylinders. At the time, the conductive rubber material is forced to pass through the extrusion die along the inner path, while the insulating rubber material is forced to pass through along the outer path. Thereby, a molded piece can be obtained for the relay connector 19 that has the conductive rubber layer 40 and the insulating rubber layer 50 arranged on the periphery of the conductive rubber layer 40. During the extrusion process, the molded piece is compressively stressed, and thereby the firm and intimate attachment is formed between the conductive rubber layer 40 and the insulating rubber layer 50. Accordingly, a single piece as an integrated combination of the layers is continuously produced by the extrusion, so as to form a predetermined shape. The extrusion product is cut into the desired size, and thereby a plurality of similar pieces as relay connectors 19 can be obtained in succession.

The relay connector 19 has a function for providing the electrical connection between an outer lead 32 of a cold cathode tube 17 and the circuit pattern 23 of the inverter board 21. For instance, the relay connector 19 can be mounted as follows.

Firstly, the relay connector 19 is inserted into a mounting hole 22 on the inverter board 21, from the back side of the inverter board 21 (i.e., the opposite side of the surface having the circuit pattern 23 formed thereon). The insertion begins with the part of the relay connector 19 covered by the upper-part covering portion 53, and thereafter proceeds to the part of the board connecting portion 41 covered by the upper-surface covering portion 52. During the insertion, the board connecting portion 41 (and the upper-surface covering portion 52) elastically deform due to the insertion force, because the width of the mounting hole 22 is set to be smaller than the width of the board connecting portion 41. As a result of the insertion, referring to FIG. 7, the relay connector 19 is fixed to the inverter board 21 while the linear concave portions 44 of the board connecting portion 41 nip the inverter board 21. Once the relay connector 19 has been inserted involving the elastic deformation, it is prevented from accidental detachment.

On the inverter board 21, the circuit pattern 23 is arranged on the surface on the chassis 14 side. As a result of mounting the relay connector 19 to the inverter board 21, the conductive rubber layer 40 (or specifically, the board connecting portion 41) of the relay connector 19 can have contact with the circuit pattern 23, and thereby the relay connector 19 is conductively connected to the inverter board 21. Note that the width of the linear concave portion 44 is set to be equal to or slightly smaller than the thickness of the inverter board 21. Accordingly, the board connecting portion having the linear concave portions 44 involves elastic deformation when holding the inverter board 21. Therefore, due to the elastic restoring force of the board connecting portion 41, a gap is prevented from being left between the conductive rubber layer 40 and the circuit pattern 23, and consequently a stable connection is provided therebetween.

Next, the inverter board 21 is mounted to the chassis 14. At the time, the inverter board 21 is positioned so that the relay connectors 19 mounted on the inverter board 21 overlap with the through holes 14*h* of the chassis 14. Then, the part of each relay connector 19 covered by the upper-part covering portion 53 is inserted into the corresponding through hole 14*h*, so as to be exposed to the inner side of the chassis 14 (i.e., the side on which the cold cathode tubes 17 are arranged). Thereafter, the inverter board 21 is fixed to the chassis 14, for example, by screws.

Lastly, referring to FIG. 8, the outer leads 32 of each cold cathode tube 17 are inserted into the outer-lead insert holes 45 provided on the electrode connecting portions 43 (of the conductive rubber layers 40) of the respective relay connectors 19. Note that the diameter of the outer-lead insert hole 45 is set to be slightly smaller than the diameter of the outer lead 32. Accordingly, in order to allow the insertion of the outer lead 32, the surrounding electrode connecting portion 43 elastically deforms so as to increase the hole diameter. Once the outer lead 32 has been thus inserted, the escape of the outer lead 32 is prevented by the sufficient holding force due to the contact pressure from the electrode connecting portion 43.

The backlight device 12, the liquid crystal display device 10 having the backlight device 12, and the television receiver TV having the liquid crystal display device 10, which have the above constructions, can provide the following operational effects.

According to the present embodiment, the backlight device 12 includes relay connectors 19, each of which includes a conductive rubber layer 40 and an insulating rubber layer 50 arranged on the periphery of the conductive rubber layer 40. The relay connector 19 provides the electrical connection between a cold cathode tube 17 and the inverter board 21.

The relay connector 19 should include a conductive member for providing the electrical connection between the cold cathode tube 17 and the inverter board 21, and an insulating member for suppressing a leak from the conductive member. Conventionally, the conductive member is made of metal, while the insulating member is made of resin. The members thus differing in material from each other should be formed individually by different processes.

However, in the present embodiment, the relay connector 19 includes a conductive rubber layer 40 made of a conductive rubber and an insulating rubber layer 50 made of an insulating rubber. Thus, the relay connector 19 is entirely formed of similar materials (i.e., rubbers), and therefore can be formed as a single unit by the same process, e.g., by two-shot molding. Consequently, the number of components can be reduced in comparison to the conventional construction, and thereby cost reduction in the backlight device 12 can be achieved.

In the present embodiment, the relay connector 19 is formed by two-shot extrusion molding. Due to the two-shot molding thus employed for the manufacture, the number of man-hours can be reduced in comparison to the conventional manufacturing method. Further, due to the extrusion molding, the number of man-hours and the material cost can be reduced, for example, in comparison to a case where relay connectors 19 are sequentially manufactured by injection molding using a die. Consequently, the cost reduction in the relay connector 19 and therefore in the backlight device 12 can be achieved.

Further, in the present embodiment, the conductive rubber layer 40 of the relay connector 19 includes an electrode connecting portion 43 to be connected to the outer lead 32 provided on the cold cathode tube 17, and further includes a board connecting portion 41 to be connected to the circuit pattern 23 provided on the inverter board 21.

According to the construction, the relay connector 19 can be connected to the cold cathode tube 17 and the inverter board 21, by the conductive rubber layer 40. Therefore, a connecting member such as a harness, used in the conventional construction, can be eliminated, resulting in contribution to the cost reduction.

Moreover, in the present embodiment, the outer-lead insert hole 45 is formed through the electrode connecting portion 43, so that the outer lead 32 can be inserted therein.

According to the construction, the connection between the cold cathode tube 17 and the relay connector 19 can be completed simply as a result of an operation for inserting the outer lead 32 into the outer-lead insert hole 45 of the electrode connecting portion 43. Thus, the effort for the connecting operation can be saved.

In the present embodiment, the mounting holes 22 are provided on the inverter board 21 so that the relay connectors 19 can be mounted thereto. Further, the linear concave portions 44 are provided on the board connecting portion 41 of the relay connector 19, and thereby can nip the portions of the inverter board 21 on the periphery of the mounting hole 22 while the board connecting portion 41 is mounted through the mounting hole 22.

According to the construction, the fixation of the relay connector 19 to the inverter board 21 can be completed by inserting the board connecting portion 41 of the relay connector 19 into the mounting hole 22, with the linear concave portions 44 in engagement with the inverter board 21. That is, a separate fixing member is not required for fixing the relay connector 19 to the inverter board 21 and therefore to the backlight device 12. Consequently, the number of components can be reduced, resulting in contribution to the cost reduction.

Further, the board connecting portion 41 is provided on the conductive rubber layer 40, and therefore the electrical connection between the relay connector 19 and the inverter board 21 can be established as a result of mounting the relay connector 19 to the inverter board 21. Thus, the effort for the connecting operation can be saved.

Shown above is an embodiment of the present invention. However, the present invention is not limited to the embodiment explained in the above description made with reference to the drawings. The following embodiments may be included in the technical scope of the present invention, for example.

Figure 9:
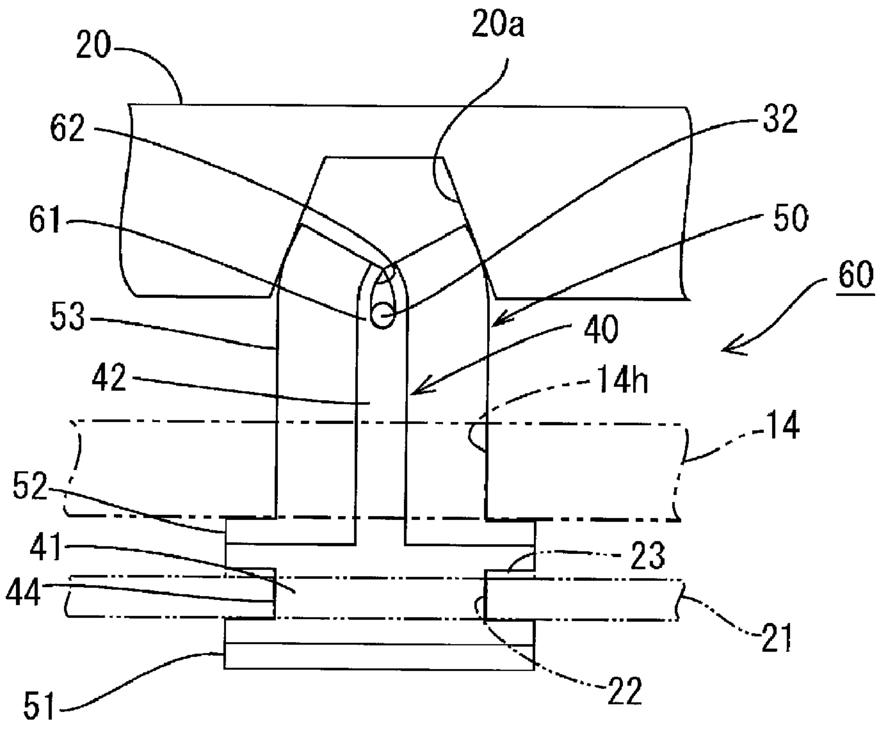
FIG. 9 is a front view showing a modification of the relay connector.

(1) In the above embodiment, the relay connector 19 is connected to the cold cathode tube 17 by inserting the outer lead 32 of the cold cathode tube 17 into the outer-lead insert hole 45 formed through the electrode connecting portion 43 of the relay connector 19. However, the connection therebetween is not limited to this construction. As shown in FIG. 9, a relay connector 60 may include a groove portion 62 on the upper portion of an electrode connecting portion 61, for example. According to the construction, the cold cathode tube 17 can be connected to the relay connector 60 by fitting the outer lead 32 into the groove portion 62 through the opening thereof.

In the construction that employs this relay connector 60, the holder 20 for collectively covering the relay connectors 60 may include nipping portions 20*a* on its inner side, each of which is arranged to apply a contact pressure to the upper portion of the relay connector 60 from the lateral sides so as to close the upper opening of the groove portion 62. Thereby, the groove portion 62 can hold the outer lead 32 more stably.

Figure 10:
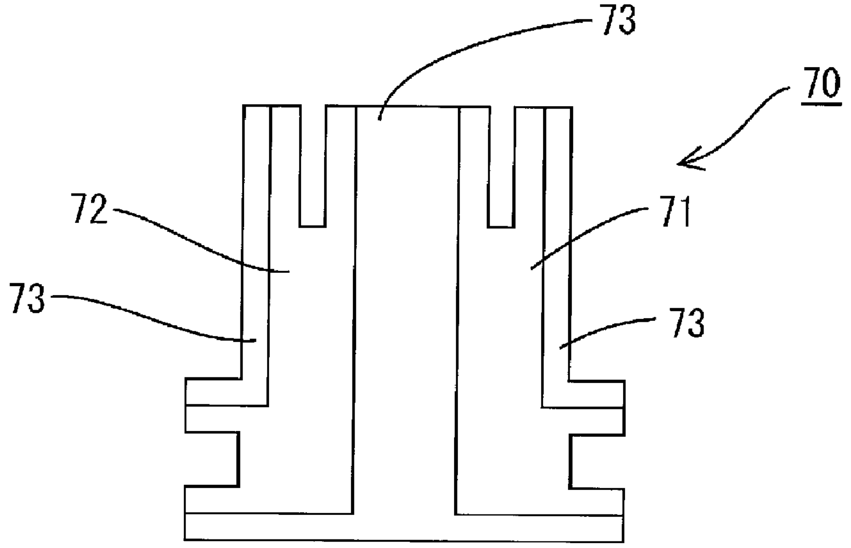
FIG. 10 is a front view showing another modification of the relay connector.

(2) In the above embodiment, the relay connector 19 having a two-layer structure formed of a conductive rubber layer 40 and an insulating rubber layer 50 is shown for illustrative purposes. However, the relay connector may have a multi-layer structure formed of three or more layers. As shown in FIG. 10, a relay connector 70 may have a three-layer structure formed of parallel-arranged first and second conductive rubber layers 71, 72 and an insulating rubber layer 73 arranged to surround the conductive rubber layers and further arranged therebetween, for example. This relay connector 70 can be formed by multi-shot molding, for example, and is suitable for the connection to a hot cathode tube 170.

Figure 11:
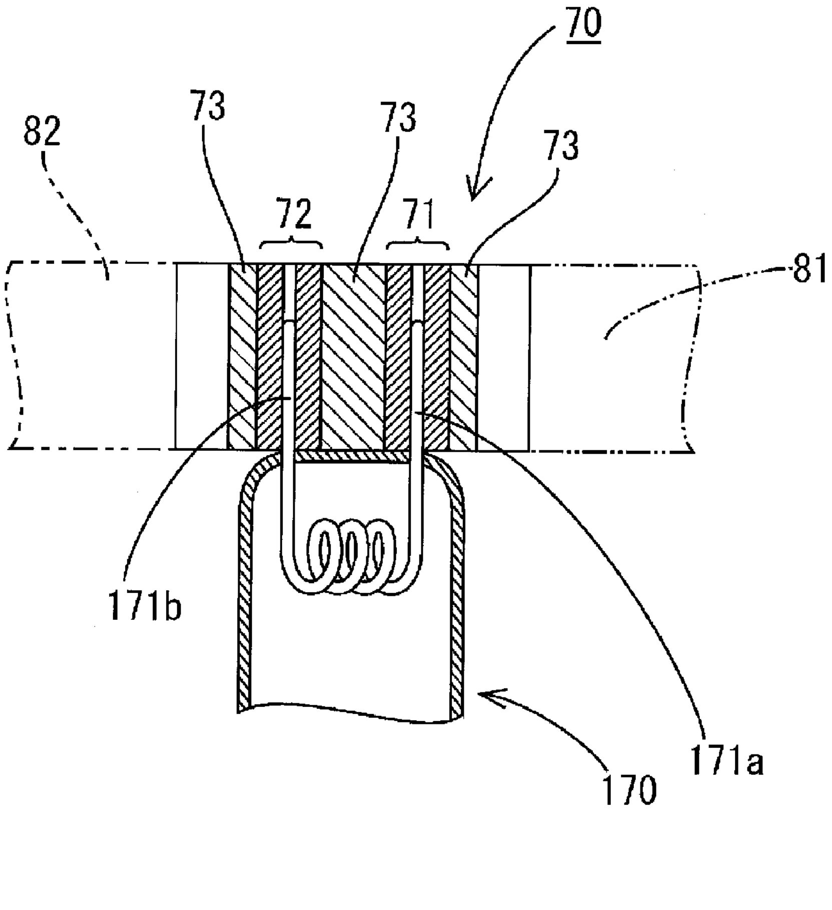
FIG. 11 is a sectional view illustrating how to mount the relay connector shown in FIG. 10.

Referring to FIG. 11, the hot cathode tube 170 has two filaments 171*a*, 171*b* projecting therefrom. In some cases, the filaments 171*a*, 171*b* should be connected to a first external power source 81 and a second external power source 82, respectively, which individually supply different levels of power (or voltage). In this case, the filaments 171*a*, 171*b* are connected to the respective first and second conductive rubber layers 71, 72 insulated from each other, while the first and second conductive rubber layers 71, 72 are connected to the respective first and second external power sources 81, 82. Thus, the hot cathode tube 170 can be electrically connected to the external power sources 81, 82, via the relay connector 70.

Figure 12:
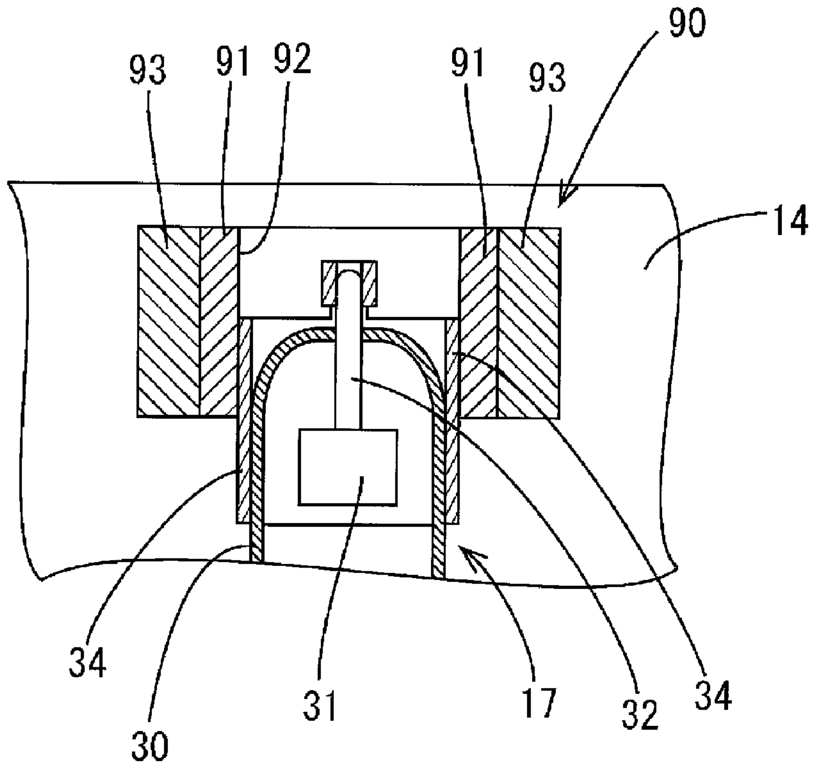
FIG. 12 is a sectional view showing another modification of the relay connector.

(3) In the above embodiment, the cold cathode tube 17 is connected to the relay connector 19 by inserting the outer lead 32 of the cold cathode tube 17 into the outer-lead insert hole 45 of the relay connector 19. Instead, the connection may have a construction shown in FIG. 12, for example. According to the construction, the cold cathode tube 17 has ferrules 34, which are fitted onto the glass tube 30 so as to be connected to the outer leads 32. On the other hand, a relay connector 90 includes a ferrule connecting hole 92 formed through a conductive rubber layer 91, and an insulating rubber layer 93 is arranged on the periphery of the conductive rubber layer 91. The cold cathode tube 17 can be connected to the relay connector 90 by inserting the ferrule 34 provided the cold cathode tube 17 into the ferrule connecting hole 92 provided on the relay connector 90. Consequently, the ferrule 34 has contact with the conductive rubber layer 91 of the relay connector 90, and thereby the cold cathode tube 17 can be conductively connected to the relay connector 19.

(4) In the above embodiment, the conductive resin layer and the insulating resin layer of the relay connector 19 are made of rubbers. However, the properties of rubbers such as elasticity need not necessarily be provided, and therefore any resin may be selected, for example, based on the moldability and/or the strength.

(5) In the above embodiment, the conductive rubber layer 40 of the relay connector 19 is partly exposed. However, the exposed area of the conductive rubber layer 40 may be partly covered with an insulating material, for example. Thereby, a leak from the conductive rubber layer 40 can be further reliably suppressed.

(6) In the above embodiment, cold cathode tubes 17 are used as light sources. However, the present invention can include a construction in which another type of light sources such as hot cathode tubes or xenon tubes is used, for example.

(7) In the above embodiment, the backlight device 12 included in the liquid crystal display device 10 is shown as a lighting device, for illustrative purposes. However, the present invention can include another type of lighting device such as a fluorescent lamp lighting appliance.

(8) In the above embodiment, TFTs are used as switching elements of the liquid crystal display device 10. However, the present invention can be applied to a liquid crystal display device that uses another type of switching elements than TFTs (e.g., thin-film diodes (TFDs)). Further, the present invention can be applied to a liquid crystal display device for monochrome display, as well as a liquid crystal display device capable of color display.

(9) In the above embodiment, the liquid crystal display device 10 having the liquid crystal panel 11 as a display panel is shown for illustrative purposes. However, the present invention can be applied to a display device that uses another type of display panel. Further, the present invention can be applied to other types of display devices such as an advertising display.

The invention claimed is:

1. A lighting device comprising:

a light source;

an external power source arranged to supply drive power to said light source; and a relay connector arranged to provide an electrical connection between said light source and said external power source; wherein said relay connector includes a conductive resin layer and an insulating resin layer arranged on a periphery of said conductive resin layer;

said light source includes a drive power input portion, while said external power source includes a circuit board;

said conductive resin layer includes an electrode connecting portion to be connected to said drive power input portion and a board connecting portion to be connected to said circuit board;

a mounting hole is provided on said external power source, so that said relay connector is mounted thereto;

said board connecting portion includes a linear concave portion, which nips a portion of said external power source on a periphery of said mounting hole while said board connecting portion is mounted through said mounting hole;

the conductive resin layer is made of a conductive rubber;

the conductive resin layer is provided with a board connecting portion having a bedplate shape, a link portion extending from the board connecting portion and having an upright plate shape, and an electrode connecting portion provided at a distal end of the link portion; and the insulating resin layer is arranged to cover the board connecting portion, the link portion, and the electrode connecting portion.

2. A lighting device as in claim 1, wherein said relay connector is provided as a product of two-shot molding, by which said conductive resin layer and said insulating resin layer are formed.

3. A lighting device as in claim 1, wherein said relay connector is obtained from a product that is continuously produced by extrusion molding.

4. A lighting device as in claim 1, wherein an insert hole is formed through said electrode connecting portion, so that said drive power input portion is inserted therein.

5. A display device comprising:

a lighting device as in claim 1; and a display panel arranged to provide display by use of light from said lighting device.

6. A display device as in claim 5, wherein said display panel is provided as a liquid crystal panel that uses liquid crystal.

7. A television receiver comprising a display device as in claim 5.

* * * * *